United States Patent
Shekhar

(10) Patent No.: US 12,373,435 B2
(45) Date of Patent: Jul. 29, 2025

(54) DYNAMIC CACHE MANAGER

(71) Applicant: ORACLE INTERNATIONAL CORPORATION, Redwood Shores, CA (US)

(72) Inventor: Shashank Shekhar, Bokaro (IN)

(73) Assignee: Oracle International Corporation, Redwood Shores, CA (US)

( * ) Notice: Subject to any disclaimer, the term of this patent is extended or adjusted under 35 U.S.C. 154(b) by 26 days.

(21) Appl. No.: 17/979,560

(22) Filed: Nov. 2, 2022

(65) Prior Publication Data

US 2024/0143593 A1     May 2, 2024

(51) Int. Cl.
   *G06F 16/2455*   (2019.01)
   *G06F 16/21*     (2019.01)

(52) U.S. Cl.
   CPC ...... *G06F 16/24552* (2019.01); *G06F 16/219* (2019.01)

(58) Field of Classification Search
   CPC .................... G06F 16/24552; G06F 16/219
   See application file for complete search history.

(56) References Cited

U.S. PATENT DOCUMENTS

| 11,288,243 B2 | 3/2022 | Hall et al. | |
|---|---|---|---|
| 2009/0177667 A1* | 7/2009 | Ramos | G06F 16/24552 707/E17.046 |
| 2017/0316321 A1* | 11/2017 | Whitney | G06F 16/9574 |
| 2021/0034760 A1* | 2/2021 | Banga | G06F 21/602 |
| 2022/0215008 A1* | 7/2022 | Adibowo | G06F 12/0802 |

OTHER PUBLICATIONS

Sami Alabed (Girton College); RLCache: Automated Cache Management Using Reinforcement Learning; p. 1-89; Oct. 1, 2019; University of Cambridge, Computer Lab; Cambridge, UK.

* cited by examiner

*Primary Examiner* — Amy Ng
*Assistant Examiner* — Anthony G Gemignani
(74) *Attorney, Agent, or Firm* — Kraguljac Law Group, LLC

(57) ABSTRACT

Systems, methods, and other embodiments associated with a dynamic cache manager are described. In one embodiment, a method includes monitoring, by the cache manager, queries that are submitted for execution to a database system. For a given monitored query, parsing the monitored query to identify one or more query heuristics and determine whether the one or more query heuristics matches one or more trigger heuristics from a set of query predictions, wherein the set of query predictions are predicted by a machine learning model. The cache manager prefetches query results corresponding to a predicted query pattern and stores the prefetched query results in a cache.

19 Claims, 5 Drawing Sheets

Example Query Log Entries

Query Entry 1

[2019-01-10T11:56:44.182+08:00] [OBIS] [TRACE:7] [] [] [ecid: 7e838bc8-5eb0-4e74-baa5-636290014208-000000be,0:1:25:3] [sik: ssi] [tid: 1a366700] [messageid: USER-0] [requestid: bede0005] [sessionid: bede0000] [username: 1511946] ############################################### [[
--------------------- SQL Request, logical request hash:
1647a696
SET VARIABLE QUERY_SRC_CD='DashboardPrompt';SELECT CASE WHEN MONTH(CURRENT_DATE) >=9 THEN TIMESTAMPADD(SQL_TSI_MONTH, 8,EVALUATE('TRUNC(%1,%2)' AS DATE,"Period"."Snapshot Date",'YEAR')) ELSE TIMESTAMPADD(SQL_TSI_MONTH, -4,EVALUATE('TRUNC(%1,%2)' AS DATE,"Period"."Snapshot Date",'YEAR')) END AS START_DATE FROM "Workbench" where "Period"."Snapshot Date"=CURRENT_DATE

Query Entry 2

[2021-04-12T15:36:12.635-04:00] [OBIS] [TRACE:2] [USER-0] [] [ecid: ed1cbdc6-8ca3-47fb-b8b4-2070d2d455f6-000015af,0:3:48:3] [sik: ssi] [tid: 6bc64700] [messageId: USER-0] [requestid: 9625000a] [sessionid: 96250000] [username: obieadmin] ############################################### [[
--------------------- SQL Request, logical request hash:
90c5e89c
SET VARIABLE QUERY_SRC_CD='Visual Analyzer',SAW_SRC_PATH='{"viewID":"DatasetPreviewTable","currentCanvas":"canvas!1"}',DISABLE_CACHE_SEED=1,DISABLE_XSA_CACHE_SEED=1,ENABLE_DIMENSIONALITY=1;SELECT
   0 s_0,
   XSA('obieadmin'.'081cd087-f08f-4b47-aa8b-3ab309c10f32')."input"."Data"."COUNT1" s_1
FROM XSA('obieadmin'.'081cd087-f08f-4b47-aa8b-3ab309c10f32').input."Data"
FETCH FIRST 101 ROWS ONLY

FIG. 2

DYNAMIC CACHE MANAGER

BACKGROUND

Computer systems often include a cache to store certain information that will be used again by future requests. A cache is usually an in-memory data store used to provide certain resources (mostly data from database) to applications that are seeking a resource. Since the cache is in-memory, accessing data residing in the cache is quicker than accessing data from a database, which is slower.

The size of the cache is fixed and is usually much smaller than the size of the database. Hence, the system cannot store all the database's data in the cache. This situation causes the system to determine what data to choose to be stored in the cache, and when the cache's storage limit is reached, what data to choose to evict from the cache so that newly chosen data can now be populated in the cache. To make such decisions, a cache manager is typically used.

The cache manager includes an algorithm that controls decisions about what data to store, how long to store the data, and what data to evict. The performance of the computer system is affected by how well the cache manager and the cache perform.

A key parameter that indicates effectiveness of a cache manager is the cache hit ratio. The higher the cache hit ratio, the better the cache manager is performing. A cache hit occurs when a requested resource/data is available in the cache. A cache miss occurs when the requested resource/data is not in the cache, thus requiring the resource/data to be fetched from a slower database. Caches usually have a limit on how big in size the cache can grow (e.g., limited amount of data can be stored). Hence, the cache manager needs to employ a caching strategy to achieve acceptable cache hit ratios.

Current strategies employed by cache managers are all based on fixed algorithms. To determine which fixed algorithm to use, an administrator typically selects a best match from the available fixed algorithms based on how the administrator believes the cache will be used. A few examples are Least Recently Used (LRU) caches, Least Frequently Used (LFU) caches, etc. Using such fixed algorithms is not optimal as cache management does not change when data traffic or usage changes. However, the data traffic and/or usage typically varies dynamically for each organization. Thus, a fixed algorithm is suboptimal.

SUMMARY

In one embodiment, a computing system is described that includes a cache manager configured to operate with a cache. The cache manager is configured with a machine learning (ML) model trained to identify query patterns associated with one or more query heuristics. The cache manager is further configured to monitor queries that are submitted for execution to a database system and/or other real-time conditions such as a current time. For a received query, the received query is parsed to identify one or more query heuristics associated with the query and determine whether the one or more query heuristics matches the one or more trigger heuristics from the set of query predictions. In response to the one or more query heuristics matching a first trigger heuristic from the one or more trigger heuristics, the cache manager submits a first predicted query pattern to the database, wherein the first predicted query pattern corresponds to the first trigger heuristic. Query results corresponding to the first predicted query pattern are prefetched and stored in the cache.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 2 illustrates one example of query entries from a query history log, in one embodiment.

DETAILED DESCRIPTION

Figure 1:
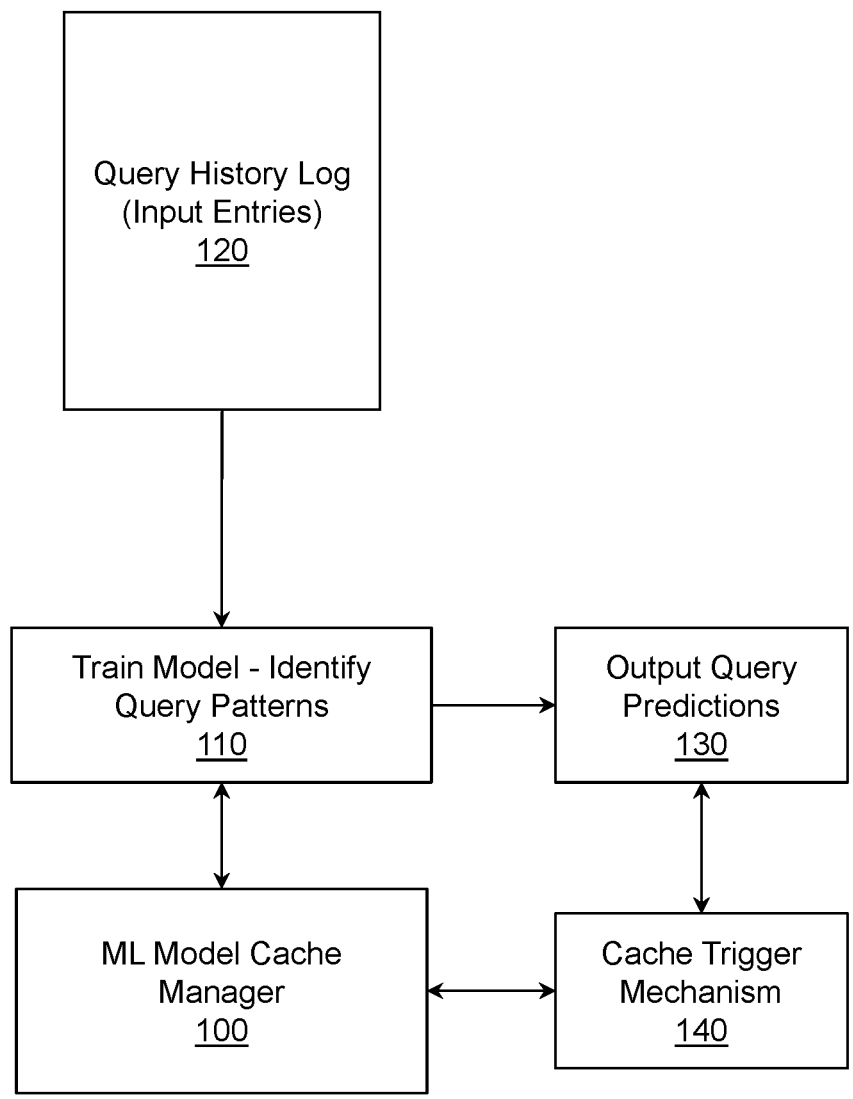
FIG. 1 illustrates one embodiment of a system associated with training a machine learning cache manager to predict query patterns.

Systems and methods are described herein that provide a cache management system (cache manager) implemented with a machine learning (ML) model trained to predict likely queries to be received by a server or database system. For example, while observing real-time transactions and queries being received, the cache manager may predict an upcoming set of queries that are likely to be received based on query patterns learned by the ML model. In response to the prediction, the cache manager pre-fetches query results associated with the predicted upcoming set of queries and pre-populates a cache with the query results from the predicted queries. Thus, if and when the predicted set of queries are actually received by the system, the query results are already in the cache (cache hit). Accordingly, the system may then return the query results to the query requestor in a much faster response time as compared to retrieving the query results from a non-cache storage location when the query results are not in the cache (cache miss).

In one embodiment, the present system is configured with a tailor-made cache manager that efficiently adapts a caching mechanism according to changing dynamic traffic (e.g., queries) by 'learning' the traffic/query pattern and then intelligently managing caches based on the patterns learnt from historical data. In one embodiment, the query patterns are learned per service instance or other organization scheme that separates clients from each other.

Furthermore, in another embodiment, based on a cache hit ratio, the cache manager can determine an effectiveness and success of the current caching mechanism. If the hit ratio falls below a threshold, the cache manager's ML model may re-learn (e.g., as is used in Reinforcement Learning strategies) the traffic pattern and then adjust the caching mechanism dynamically by changing the cache population strategy and/or the cache eviction strategy. This may include switching the active caching strategy from the ML-model based strategy to a different, fixed caching algorithm. As such, the cache system may periodically switch between at least two different cache strategies based on their respective cache hit ratios.

Definitions

As used herein, a "query pattern" or "pattern" includes, but is not limited to, one query or multiple queries that are submitted to a database in a reoccurring manner. For example, the same query being submitted at a periodic interval or in response to some event/condition may be a query pattern.

As used herein, a "heuristic" includes, but is not limited to, a variable, a parameter, and/or a condition that is associated with a query and is used by the present system to identify query patterns and/or make intelligent predictions about which queries are likely to occur and when. Example heuristics that may be include, but are not limited to, an origin/source of a query (e.g., origin identifier), a time and/or time zone that a query is submitted, a username who submitted a query, a role of a user that submitted a query, or other type of heuristic that may be associated with a query.

As used herein, a "trigger heuristic" includes, but is not limited to, particular values of one or more heuristics, or combination of heuristics, that the machine learning (ML) model has identified to likely trigger a certain query or query pattern to be issued to the system. A trigger heuristic may be viewed as answering the question, what causes a query pattern to be issued? For example, based on the query patterns identified by the ML model, the ML model generates an output that includes trigger heuristics that correspond to and seem to cause particular query patterns. Thus, when a trigger heuristic is observed or identified in real-time, the cache manager can decide that the predicted query pattern associated with the trigger heuristic is expected to be issued. The cache manager may then pre-fetch query results for the predicted query pattern and store the query results in the cache prior to the queries actually being issued.

As used here, an "origin identifier (ID)" includes, but is not limited to, an identifier that identifies the origin or otherwise the source of a query. An origin ID is one type of heuristic that may be used. The origin/source of a query refers to who or what requested, issued, or initiated the query. This may include different types of origin IDs such as a particular username, a certain type of user (e.g., role of a user), an application that submits query requests such as a dashboard application, a function within an application such as a particular report, etc. In some applications, one or more queries may be programmatically initiated or triggered by the occurrence of a defined trigger condition. This may include a set of queries being triggered and issued by a particular origin ID at a specified date and/or time (timestamp) that reoccurs, or queries being automatically issued by a particular application when a user opens the application.

In general, the various different types of heuristics are used by the present cache management system to discover, detect, and/or learn query patterns that are associated with a particular heuristic. In other words, the present cache manager (with its ML model) is configured to learn and identify a query pattern and learn/identify its corresponding trigger heuristic. This may be learned from historical query entries submitted to a database system and analyzing the heuristics of each query entry. The learned trigger heuristic (which may include a combination of heuristics) is then used as a signal to predict when the corresponding query pattern may potentially be issued again to the database system during real-time. In one embodiment, the trigger heuristic is used as a trigger condition to initiate a pre-fetch of query results from predicted queries associated with the trigger heuristic. In general, there may be multiple trigger heuristics identified by the ML model where each trigger heuristic corresponds to a particular predicted query pattern.

As stated, a trigger heuristic may be a combination of values from different heuristics such as a combination of two or more different types of heuristics (e.g., dashboard ID+query issue timestamp), or a query source and a trigger condition. For example, a query pattern may be associated with a particular username and particular time/day, which together form the trigger heuristic for the corresponding query pattern.

In one embodiment, a trigger heuristic may be regarded as a trigger condition that has been learned by the ML model to have a predicted query pattern associated thereto. Different trigger heuristics and their predicted query patterns may be generated as output from the ML model and recorded in a database for use by the cache manager to prefetch query results as described herein. In one embodiment, the ML model may generate a list of predictions where each prediction includes at least a trigger heuristic and an associated predicted query pattern. Each prediction may be in a form of a tuple, for example, <Trigger Heuristic, Query X> and may include other parameters such as duration of the Query. In this manner, using the list of tuples (list of predictions) in real-time, when a "Trigger Heuristic" is observed in real-time, the cache manager prefetches the query results of the associated Query X.

Overview

In general, a cache manager is configured to decide what objects/data to load into a cache, decide how long each object/data should be kept in the cache, and decide what objects/data to remove/evict from the cache when the cache is full. The present cache manager is configured with a machine learning (ML) model that learns query patterns based on historical query logs and makes predictions of upcoming queries (based on the output from the ML model) in order to determine what objects/data to prefetch and load into the cache. The following examples include, but are not limited to, systems where the present cache manager may be implemented.

In one embodiment, a cloud-based server may provide services, including database services, to remote clients. A client may submit queries to the server to retrieve data specified by the query. However, sometimes, the server may receive certain queries that are triggered by a condition or action such as after a "report" is opened or a "dashboard" is opened. The reports or dashboards may contain a set of visualizations that when opened or refreshed, initiate a set of queries to the server to retrieve the respective data for the report or dashboard. Hence, these reports and dashboards translate to a set of queries being issued in a reoccurring pattern.

Each time a user opens the same report or the same dashboard on their client device, the same set of queries are often triggered and sent to the server. The user may also be opening the dashboard at about the same time on a particular day, repetitively, which triggers the same query submissions. This is a query pattern. If a dashboard has multiple pages, there may be a "pattern" in the queries issued from the multiple pages.

A cache hit-ratio may be improved by the present cache manager by learning and being "aware" of the query pattern associated with particular heuristics such as the particular query origin or source (e.g., a particular report or dashboard, and/or timestamp). By predicting an upcoming query pattern, the present system may easily pre-fetch the results/objects/tables/data associated with the predicted queries by issuing the predicted queries to the server prior to the report or dashboard actually issuing the queries. Thus, the cache may improve the cache hit ratio and provide improved performance when responding to queries.

In one embodiment, the example reports and dashboards mentioned above may have an associated origin identifier (origin ID) that may be used to identify a particular source/origin that submitted or triggered the queries. For example, a dashboard may have an assigned Dashboard ID. These origin IDs are one of the heuristics that may be used by the present cache system to predict an expected next set of queries. Various other sets of heuristics (defined previously and further explained below) may also be defined and used to make intelligent guesses/predictions about what data to cache in advance and thus significantly increase cache hits.

In another example, a client may use analytics software for making a cadenced presentation to management. As part of the presentation, a set of reports/dashboards may be presented to the management in a cadence (e.g., a board meeting happening on the first day of every month, or a review meeting happening every week). Such presentations may trigger the same set of queries to obtain data for the presentations. Hence, a specified time or date (e.g., timestamp) may be another heuristic that can be used by the present cache system to identify an associated query pattern.

In another example, a multinational organization may have different teams in different parts of the world that are connected to a cloud service. Each team may be responsible for different pillars of the organization. For example, a customer using a CRM software might have the team operating in the business hours of India (e.g., dealing with Marketing functions and thus touching/accessing data tables only associated with marketing data), whereas another team operating in a different time zone (e.g., Pacific Standard Time) may be involved with sales functions. Hence, a time zone may be another origin ID/heuristic that may trigger a pattern of queries and thus may be a parameter in the ML model.

This roughly translates into using a cache management system that learns the pattern of the server queries by training on a model using various heuristics (such as the origin IDs described above or other selected query heuristics). Then in operation, the cache management system is configured to prefetch data from the database before the system anticipates receiving the actual queries. The pre-fetching is based at least on observing the query heuristics in real-time and determining that observed query heuristics match a trigger heuristic(s) that is associated with a predicted query pattern.

System Embodiment

With reference to FIG. 1, one embodiment of a cache manager 100 is illustrated that is associated with training a machine learning (ML) model to identify query patterns. The output (query predictions) from trained ML model is then used by the cache manager 100 to apply a cache population strategy based on the query predictions. The cache population strategy decides on which resources (e.g., objects, data tables, query results) to pre-fetch and keep in the cache. In one embodiment, the resources may be mapped to cache keys that identify the corresponding resource. As such, adding or evicting a resource from the cache may involve adding or evicting the corresponding cache key rather than the actual resource. As discussed herein, adding or evicting a resource (e.g., content) from the cache is meant to include either the actual resource or a cache key, which depends on how a particular cache is configured.

In one embodiment, the cache manager 100 is implemented based on historical pattern-based cache management. For example, the cache manager 100 is modelled to learn about data tables and/or queries that a particular entity or organization (e.g., a service instance) has been using historically. Then in operation, the cache manager 100 is configured to predict which data tables and/or queries will be used based on observed real-time queries and/or conditions, and pre-fetch and populate the cache based on the predictions. Thus, the cache manager 100 can dynamically change the cache contents based on the predictions).

It has been observed in some cloud systems (e.g., Oracle Cloud Analytics) that clients run complex queries that may take a significant amount of time for the system to process and to return results for the queries. Some of these times may be on the order of ten (10) minutes or more and may hit system processing time limits. As described herein, the present cache manager 100 is configured to recognize and predict upcoming query patterns. As a result, the cache manager 100 attempts to accurately predict when certain queries will be received by the system and prefetch query results for the certain queries, which may include these time consuming queries, into the cache. Thus, the clients may obtain the query results from the cache in milliseconds rather than in ten minutes when the results are not prefetched.

In one embodiment, the ML model of the cache manager 100 is based on a reinforcement learning technique, which is a machine learning technique where an agent tries to maximize its 'reward' when interacting with an 'environment'. As is known in reinforced learning, when the agent has taken a step that is correct, the agent is rewarded a point. The model is adjusted to maximize this reward through a feedback mechanism. In one embodiment, the cache manager 100 may be configured with three models that work together, where each model is trained to control a specific function, for example: (1) decide query results to pre-fetch and keep in the cache, (2) control refreshing of cache keys and/or cache data, and (3) determine and select queries to evict when the cache is full. The present discussion is directed to the pre-fetching functions.

With continued reference to FIG. 1, the ML model is trained (block 110) based on a query history log 120. The query history log 120, for example, contains recorded entries from historical queries and transactions submitted to a cloud system database/service over a period of time (e.g., weeks, months of transactions, etc.). The ML model may use the query logs from a selected database system to get actual historical queries issued to the system. In this manner, the historical queries from a real customer environment are used to train the ML model. Thus, the customer's run-time environment is not disturbed by, for example, monitoring and analyzing queries while the queries are being submitted in the run-time environment.

The query history log 120 may include tens of thousands of query entries from queries submitted by many different client devices that are using the cloud system. In one embodiment, the historical queries or query logs may be separated by organization such as by each individual service instance provided by the cloud system. In this manner, historical queries from organization A are not intermixed with queries from organization B. This allows the ML model to identify query patterns for each different organization and/or service instance. The ML model may also identify query patterns for different caches assigned by the system to particular users.

In another embodiment, the query logs 120 may be transformed and/or cleaned to generate a desired input that has particular data parameters, a particular format, and is recognized by the ML model. For example, a cleaning may include parsing and selecting specified parameters from each query entry, removing unnecessary data, and/or adding a missing heuristic, such as adding a user role. For example, FIG. 2 shows two example raw query entries 200 from a query history log. The raw query entries may be transformed into input entries for the ML model that have particular parameters (which are heuristics) extracted from the raw query entries. The input entries may be further modified by inserting one or more desired heuristics that are not present in a raw query entry such as "user role." In one embodiment, each input entry created from a history log query entry may be in the form of a tuple such as, but not limited to:

<Origin Id, Timestamp, Client Time Zone, Username, User Group, User Role, Query, Duration of Query>

In general, each input entry identifies a query and a number of heuristics that were part of or associated with the query when the query was submitted/issued to the database. The input entries are then submitted to the ML model for training and learning to identify query patterns and the heuristics associated with each query pattern, which become the trigger heuristics.

The following example is described with reference to a defined origin ID being a dashboard ID as a heuristic for identifying query patterns associated to a particular source.

board ID within the entries. By finding the occurrences of the dashboard ID and by tracking the types of queries that belong to the dashboard ID, the ML model learns to identify whether a query pattern is found for the given dashboard ID.

In one embodiment, to identify the occurrences of the origin ID (dashboard ID), each query entry in the log may include header information and/or parameters that identify the source of the query and/or who submitted the query. Example header information/parameters may include a time stamp, a session ID that identifies a session in a server process, a username, a message ID, and/or other identifying information used by the server and/or network. If a server process has multiple threads, each sub-thread may have a unique identifier called an ECID. A query may have other parameters that may be in the header or may be set as variables in the query. These may include source identifiers that identify an application or function that submitted the query such as a dashboard ID or report ID, as previously described.

One example of two query entries from the query log 120 are shown in FIG. 2 as raw query entries 200. The query entries 200 include a header section with various identifiers. The actual query begins with "SET VARIABLE" statement. The "SELECT" statement identifies what data to select and "FROM" which data tables and/or other data search conditions that are requested in the query. Each log entry captures the necessary query heuristics/parameters that are needed for the ML model to be trained (e.g., time, timezone, username, origin of query) except 'user role' which can be obtained offline by a user for the existing log entries. In another embodiment, for the future logs, the query entries may be enhanced to capture the user role as well.

For example, in Query Entry 2, parameters that may be used as heuristics are shown in Table 1 as follows:

TABLE 1

Time and Timezone = [2021-04-12T15:36:12.635-04:00]
Username = [username: obieadmin]
Origin of query = QUERY_SRC_CD='Visual Analyzer',
   SAW_SRC_PATH='{"viewID":"DatasetPreviewTable","currentCanvas":
   "canvas!1"}'
Note: Any comment below the query /* AdditionalDetail='VisualAnalyzer' */
   may also give information about the origin of query.
Query (used as a cache key) =
   SELECT
      0 s_0,
      XSA('obieadmin'.'081cd087-f08f-4b47-aa8b-
      3ab309c10f32')."input"."Data"."COUNT1" s_1
      FROM XSA('obieadmin'.'081cd087-f08f-4b47-aa8b-
      3ab309c10f32').input."Data"
      FETCH FIRST 101 ROWS ONLY As described previously, the origin ID is an identifier that identifies the origin or otherwise the source of a query. The origin/source of a query refers to who or what requested or initiated the query. The origin may be a report or a dashboard that when opened by a user automatically triggers one or more queries that are programmed in the report or dashboard. The origin may be a particular user that submits a manually executed query (e.g., ad hoc query). Other types of origin IDs/heuristics are described below.

With reference again to the training block 110, the ML model may be given a particular origin ID (e.g., a dashboard ID) or a number of different origin IDs as a basis for learning query patterns that may exist for the origin IDs. The ML model receives the query history log 120 as input (or the transformed input entries) and searches for the given dash- It will be appreciated that using different computing systems, different platforms, different network configurations, and/or different programming languages may result in different types of header information that is generated as part of a query or any other network transaction. Thus, in one embodiment, any type of parameter found in the header information or body of the query entry may be used as a heuristic by the cache manager to learn query patterns that may exist for a given heuristic.

In one embodiment, when the query history log 120 is used as input to the ML model, the ML model is configured to identify the format and structure of the query entries so that the parameters and desired heuristics are properly extracted. In another embodiment as previously described, the query history log 120 may be cleaned and transformed into formatted input entries that contain the desired parameters and one or more heuristics, for example:

<Origin Id, Timestamp, Client Time Zone, Username, User Group, User Role, Query, Duration of Query>.

The ML model is configured to identify the format and structure of the formatted input entries so that the heuristics and other parameters are properly identified and associated with the corresponding query.

Using a given dashboard ID, the ML model learns to identify whether a query pattern is found for the given dashboard ID. For example, the ML model may determine and learn that a particular set or sequence of queries occur repeatedly for the same dashboard ID over a monitored time period (e.g., a few weeks, or months of queries) from the input entries or the query history log. For example, the ML model may learn that dashboard ID 123 triggered and/or submitted Query X, Query Y, and Query Z multiple times in succession or simultaneously. The learned set or sequence of queries (e.g., the query pattern) is then associated to the corresponding dashboard ID.

The ML model generates an output that represents the predicted query and its trigger heuristic(s), which in this example is origin ID being dashboard ID 123. A list of output predictions 130 is generated by the ML model. In one embodiment, each output prediction may be in the form of a tuple that identifies the predicted query and the trigger heuristics that the ML model has learned which initiate the predicted query. An example format may be <One or more Trigger Heuristics, Query>. For the above example, the output prediction may be <Dashboard ID 123, Query X, Query Y, Query Z>. To the cache manager, this means that when the trigger heuristic "Dashboard ID 123" is seen in real-time in a submitted query, then a pre-fetch of queries X, Y, and Z are triggered.

In one embodiment, an output prediction may be generated for each separate predicted query and may also have a combination of trigger heuristics such as a combination of dashboard ID and timestamp. For example, three output tuples may be generated for the above pattern of three queries, which show they are triggered one second after each other:

<Dashboard ID 123, Timestamp 08:10:00, Query X>
<Dashboard ID 123, Timestamp 08:10:01, Query Y>
<Dashboard ID 123, Timestamp 08:10:02, Query Z>

To the cache manager, this prediction means that when the trigger heuristic "Dashboard ID 123" is seen in real-time as well as the current time matching the "Timestamp," then the corresponding predicted query is submitted to the database to pre-fetch its query results and store the results into the cache. In general, the output predictions 130 indicate when one or more queries are predicted to occur (based on their trigger heuristics) since they were part of a learned query pattern.

In another embodiment, the output predictions may also include a "Duration" parameter such as <Trigger Heuristic, Query, Duration>. The duration is a time duration representing how long the associated query takes to process by the system. The ML model may learn the time durations of each predicted query from the query history logs. For example, a prediction may be <Time 08:10:00, Query X, 3 minutes>, which means that Query X is predicted to occur at time 08:10:00 and takes 3 minutes to process. As a result, the cache manager is configured to pre-fetch the query results of Query X at least 3 minutes or more prior to the actual trigger heuristic of Time 08:10:00. This ensures that the query results are pre-fetched and available in the cache prior to Time 08:10:00.

For example, the cache manager determines the time to initiate the pre-fetch as Time−(Duration+Offset) where Offset is an extra amount of time (equal to or greater than 0) that may be added to the Duration to ensure the query results are completed prior to the trigger Time. In this manner, the predicted query results are prefetched and available in the cache prior to the predicted Time when the actual query is expected to be issued in real-time.

From one viewpoint, the output query predictions 130 of the ML model (e.g., the tuples <Trigger Heuristic(s), Query, Duration>) are prediction instructions for prefetching the predicted "Query" when the "Trigger heuristic(s)" occurs or is observed in real-time.

In one embodiment, the cache manager 110 is implemented with a cache trigger mechanism 140 that operates in real-time. The cache trigger mechanism 140 is configured to determine when to trigger a query pre-fetch based on the output predictions 130 and observed real-time conditions. This will be discussed in more detail with reference to FIG. 3.

Returning to the ML model training, in one embodiment, the ML model may also be given multiple different heuristics (e.g., different origin IDs) to learn query patterns for each of the different origin IDs in a similar manner. The output query predictions 130 and their associated predicted query patterns that are learned by the ML model. When the ML model does not find or learn a query pattern for a given origin ID, the given origin ID may be discarded and an output prediction is not generated in the predictions 130.

In another embodiment, rather than or in addition to being given a specified origin ID/heuristic and then learning an associated query pattern, the ML model may be trained to learn both the query pattern and associated trigger heuristic(s). For example, the ML model may be trained to identify reoccurring query patterns in the history log 120 whether from the raw entries or the reformatted input entries. From the query entries associated with a reoccurring query pattern, the ML model may then determine the likely heuristic(s) that is most associated/common to all the queries in the query pattern. This heuristic or multiple heuristics become the trigger heuristic or combination of trigger heuristics in the output query prediction 130 for the associated query pattern.

This may be performed by analyzing the query entries (or reformatted entries) from the query history log 120 belonging to the query pattern and identifying the heuristics that are found in all the query entries that may be the query source and/or trigger conditions of the query pattern. In some instances, the trigger heuristic may be a combination of values such as a username and time, a dashboard ID and time, etc. The identified heuristic(s) is set as the trigger heuristic(s) for the corresponding predicted query pattern in the output predictions 130.

Since there may be multiple heuristics associated with a query pattern, some heuristics may be more prominent or relevant to the query pattern being issued. The ML model may assign a weight to each heuristic to show which heuristics are more or less prominent as a trigger heuristic. Thus, in one embodiment, the output query predictions 130 may also include a weight assigned to each trigger heuristic in a prediction. Using the tuple example, this may be represented as:

<Trigger Heuristic 1, Weight 1, Trigger Heuristic 2, Weight 2 . . . Trigger Heuristic N, Weight N, Query X>

In this manner, there may be competing heuristics for determining when a predicted query will be issued in real-time. In one embodiment, the output query predictions 130 may have all "N" heuristics that are selected to be used with their assigned weight. Thus, what heuristics or set of heuristics would be the driving factor (the most prominent trigger heuristics) in determining the prediction of the next set of queries will depend on the pattern and weight that the ML model learns to assign.

During operation of the cache manager 100, the learned query pattern for a trigger heuristic(s) becomes a predicted set of queries when the trigger heuristic(s) is observed in real-time. As will be described below, when the cache manager 100 identifies a trigger heuristic as part of a real-time query, the cache manager 100 prefetches query results associated with the predicted query pattern that was learned for the trigger heuristic (from the output query predictions 130). The prefetched query results are then stored in the cache in anticipation that the predicted query pattern will actually be submitted to the system. This is further described with reference to FIG. 3.

In one embodiment, the following examples are a few heuristics that may be used to represent a learning parameter(s) for the ML model of the cache manager 100. The cache manager 100 may learn query patterns of server queries by training the ML model using various heuristics in order to prefetch data from a database and store the data into a cache before the actual queries are issued.

1. Role of the user: A customer relationship management (CRM) user, with a "Customer Service Representative" (CSR) role, is typically more involved in queries regarding customer service tables relating to incidents, service level agreements (SLAs) etc., than a "Sales" user who might be more active with data tables related to revenue, sales, etc. Thus, the role of the user may be used to identify query patterns that retrieve particular data tables associated with the user role.
2. UserName: The username may be an indicator of tables that should be actively put in a queue. So, if a user is only responsible for a subset of the columns in a data table (e.g., there is Field Level Security blocking the username to view certain columns), then the cache manager 100 would only need to prefetch those columns rather than prefetching the entire data table. These types of conditions may be learned by the ML model when analyzing the query patterns from a given username.
3. Time: An organization might have teams physically sitting in different time zones catering to different product verticals. Hence, "time" may be an indicator to indicate which tables to pre-fetch in the cache. For example, the ML model may identify a predicted query pattern where employees in the United States request certain marketing tables of a product every day in the morning (e.g., between 7:00 AM and 9:00 AM). Thus, the cache manager 100 may pre-fetch those marketing tables in the morning before the U.S. employees start the day and submit the actual queries for those marketing tables.
4. Origin of the query: As previously described, queries may be generated and issued by an application, a report, a dashboard, a manual user query execution, other query source, etc. These query sources include a source identifier that appears in the submitted query. A source identifier may be, for example, an application ID, a report ID, a dashboard ID, a username, etc. which are referred to herein as an origin ID.

These types of sources may be associated with submitting a reoccurring query or set of queries. For example, a report or dashboard may be programmed with a set of queries (query pattern) that are simultaneously and/or sequentially issued to the server every time the report or dashboard is rendered by a user. In this case, if the ML model can identify that a query is a result of a dashboard rendering, then the cache manager may prefetch results of the other queries in the query pattern that are associated to the dashboard in advance rather than waiting for the dashboard to actually issue the other queries in the pattern. This can also accommodate for a pattern in a dashboard presentation. For example, suppose a user has defined a multi-page analytics report that is presented to management weekly. That report may include a list of dashboards that are visited in order by a user, where each visited dashboard triggers one or more predefined queries. The knowledge of a cadenced query pattern by the ML model can cause the queries of the dashboards to be pre-fetched and presented as soon as the cadence is hit.

5. Time Zone: A time zone may be used as a heuristic for identifying query patterns associated to the time zone. For example, this may apply for multinational companies whose teams are separated by time zones and trigger queries at a particular time.
6. Production vs Test environment: The ML model may be configured to discard test environment queries for training. Test environments are ad-hoc in nature where query patterns can be unpredictable. The ML model may be set to learn from production environment queries so that the ML model parameters are not affected by noise from the test queries. Product environment queries may be monitored and stored in the query history log 120 for analysis.

In another embodiment, the server system may be configured as a distributed architecture (e.g., Kubernetes-based platform) where a single analytics server may be handling queries from multiple customers (via multiple Service Instances). The caches used by the system would be sharded/separated by the service instance (SI) keys and only the keys relevant to the service instance would be 'in action' for caching purposes. For example, the cache may be partitioned by the SI key. The SI KEY partitioning would also be enforced in the model learning and application. The cache may be segmented based on the SI KEY, giving each service instance a non-sharable space in the cache. In one embodiment, the system can assign equal space in the cache to each service instance and then grow or shrink the cache space based on observed server traffic per instance.

In one embodiment, the historical pattern-based cache management is implemented where the ML model/cache manager 100 is modelled to learn about query issue "times" when a particular query will be issued/submitted by a user (e.g., a client, a Service Instance of an organization, etc.). The issue times that a query is submitted to a database server/service is based on and learned from when the particular query has been issued previously using the query history log 120. Learning about the issue times may include the ML model learning the days, times, intervals, etc. that a particular query has been repeatedly or consistently submitted, thus, creating a query pattern. As such, the trigger heuristic is based on a timestamp.

For example, the ML model may learn from the history log 120 that Query X has been repeatedly issued every Monday at 10:00 AM (Pacific Time Zone). The ML model may then output a prediction 130 that identifies a trigger heuristic about when and what query will be issued (e.g., Mondays at 10:00 AM (Pacific Time Zone), Query X). Using the tuple formation, the output prediction may represent:

<Timestamp "Monday 10:00:00 AM"; Time zone "Pacific", Query X>, where Timestamp and Timezone identify the trigger heuristics along with their corresponding values for triggering the predicted Query X.

In response to the trigger heuristic timestamp (the learned time) of the particular query occurring in real-time, the cache manager predicts that the particular query will again be submitted (with a certain level of confidence). The cache manager then issues the predicted query and pre-populates the cache with query results of the predicted query. The cache manager performs the pre-fetch in advance of identified trigger Timestamp and prior to the predicted query being submitted in-real time to the database system by the user.

Operation of Cache Manager

Once the ML model of the cache manager 100 has processed the query history log (input entries) 120 and generated the output query predictions 130, the cache manager 100 may be made active to control the caching mechanism of a cache. By monitoring real-time query heuristics and using the query predictions 130, the cache manager 100 can predict upcoming queries and pre-fetch query results. The ML model may also be periodically re-trained or tuned with new historical queries to generated new output query predictions 130.

Figure 3:
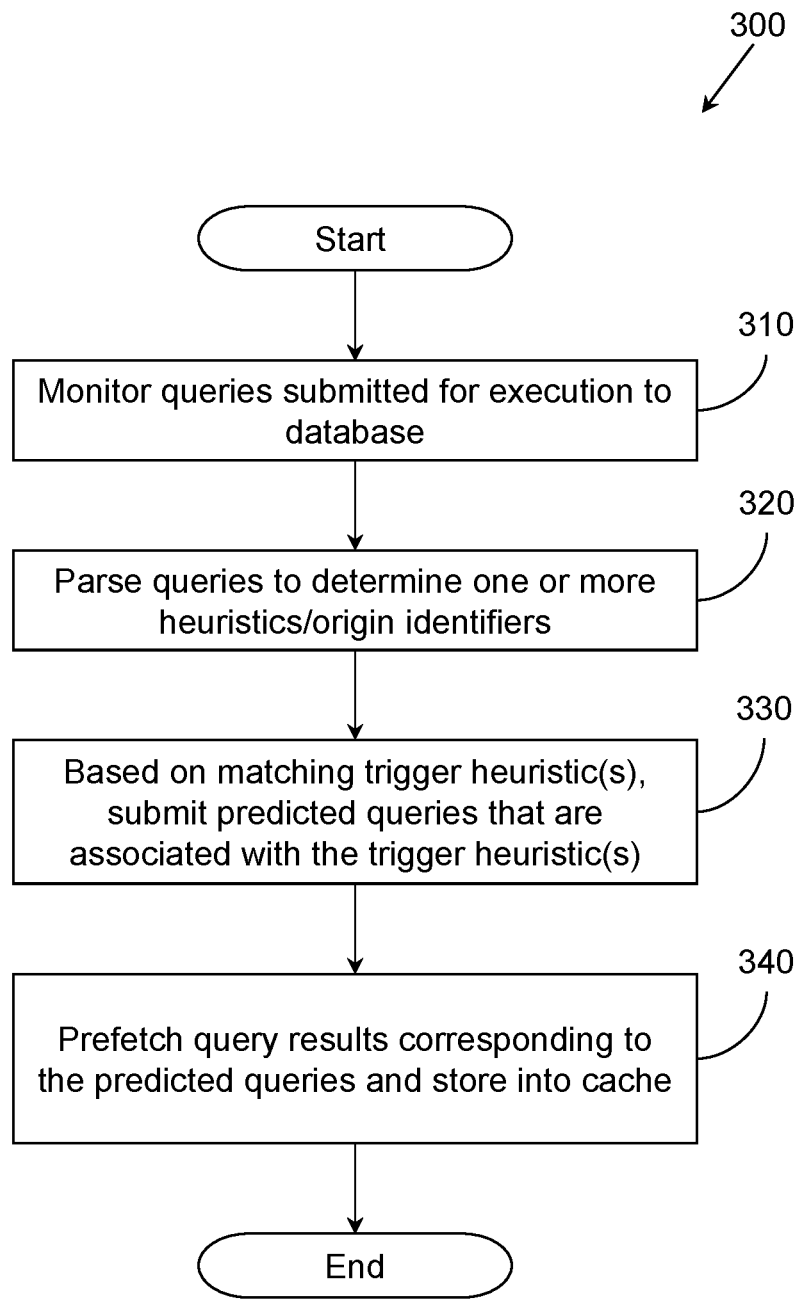
FIG. 3 illustrates one embodiment of a method associated with predicting query patterns to prefetch results into a cache.

With reference to FIG. 3, one embodiment of a method 300 associated with predicting query patterns to prefetch results into a cache is illustrated. The cache manager 100 as described in FIG. 1 is configured to operate with the cache. The cache manager 100 is also configured with the ML model that has been trained, as previously described, to identify query patterns associated with a one or more heuristics. The cache trigger mechanism 140 operates in real-time to monitor heuristics and other conditions from queries and/or the system in conjunction with the output query predictions 130. As previously explained, the output query predictions 130 are used to identify when a query pattern is predicted to occur (e.g., under which trigger heuristics).

At block 310, the cache manager 100 monitors queries that are submitted in real-time for execution to a database system. The cache manager 100 may be implemented as part of the data system and/or server and thus has access to the queries submitted to the database system. The cache manager 100 is monitoring the queries and attempts to predict whether a known query pattern will be received next or soon. The predictions are based on the output query predictions 130.

At block 320, for a received query, the query is parsed to determine whether a trigger heuristic, such as an origin identifier, is present. For example, as previously described, the output query predictions 130 contains one or more trigger heuristics for which predicted query patterns have been learned. Thus, the query heuristics from the received query are compared to the trigger heuristics from the set of query predictions 130.

In a simple example, the cache manager 100 determines whether the received query contains a heuristic/parameter that matches one of the trigger heuristics from the query predictions 130. If the received query does contain one or more heuristics/parameters that matches one of the trigger heuristics, then the cache manager 100 determines that a query pattern is likely to occur. In response, the cache manager triggers a prefetch operation for the predicted query that is associated with the one or more trigger heuristics.

For example, if the received query is found to contain an origin ID as "Dashboard ID 123" and the cache trigger mechanism 140 determines that the query predictions 130 include one or more predictions that have "Dashboard ID 123" as the trigger heuristic, such as:

<Dashboard ID 123, Query X>; <Dashboard ID 123, Query Y>; <Dashboard ID 123, Query Z>

Then, the cache manager mechanism 140 determines that the corresponding queries (e.g., Queries X, Y, and Z) are predicted to occur. Of course, as previously explained, there may be multiple trigger heuristics in the query predictions 130, and there may be weights associated to trigger heuristics that may involve additional matching and calculations to determine if the real-time query heuristics actually match the trigger heuristics.

At block 330, based on at least the matching trigger heuristic(s), the cache manager 100 submits the set of predicted queries (the predicted query pattern) that are associated with the trigger heuristic(s) from the query predictions 130. Thus, the cache trigger mechanism 140 initiates a pre-fetch operation and submits the predicted queries, which are associated with the trigger heuristic, to the database. In the above example, Query X, Query Y, and Query Z are submitted/issued to the database since these queries are anticipated to occur.

At block 340, query results corresponding to the set of predicted queries are prefetched and the prefetched query results are stored in the cache. The prefetch operation may include submitting the set of predicted queries in advance to the server in anticipation that the predict queries will soon be submitted by the source of the received query. The server processes the submitted queries and returns the query results, which are then stored into the cache.

In another embodiment, the prefetch operation may include retrieving the query results of the predicted queries from a storage location that contains the query results, without submitting the queries for execution. This may be performed when the query results were previously stored from previously executed queries (for example, query results stored as a materialized view). The prefetch operation may include prefetching cache keys associated to the predicted query results and storing the prefetched cache keys into the cache. This may or may not include evicting existing data or cache keys in the cache depending on whether the cache is full or not.

In this manner, the cache manager 100 dynamically changes the cache data and/or cache keys that represent the prefetched query results. Thus, the cache manager dynamically changes the cache data and/or cache keys based on historical query data since the query predictions 130 are based on at least the query history logs 120.

In another embodiment, the cache manager 100 is configured to predict an upcoming query pattern based on parsing a received query with an additional condition. When the received query includes a parameter that matches one of the trigger heuristics, the cache manager 100 retrieves the predicted query pattern for that trigger heuristic(s) from the query predictions 130. In the above example, there are three matching predicted queries for the trigger heuristic "Dashboard ID 123" that include Query X, Query Y, and Query Z. Additionally, the cache manager 100 may compare the received query (e.g., the actual query request) to at least the first query in the predicted query pattern. For example, the received query is compared to Query X. To increase the likelihood the predicted query pattern will be occur, the received query should match one of the queries in the predicted query pattern. Thus, the cache manager 100 may be configured to match two conditions prior to prefetching the predicted query results: (1) a trigger heuristic(s) is found in the received query, and (2) the received query matches one of the queries in the predicted query pattern for the recorded origin ID. If the received query is the same query as Query X, then the system concludes that it is very likely that Query Y and Query Z will be issued next.

As the server continues to process additional queries in real-time, the cache hit-ratio may be monitored to determine how accurate the cache manager's predictions are performing. If the predictions are accurate, meaning that the prefetched predicted results were actually used in subsequent queries, then the predicted query pattern actually occurred. This results in a higher cache hit-ratio. If the predicted query pattern did not occur, then the prefetched results would not match the real-time queries, resulting in cache misses and a lower cache hit-ratio.

Cache Switching Embodiment

Figure 4:
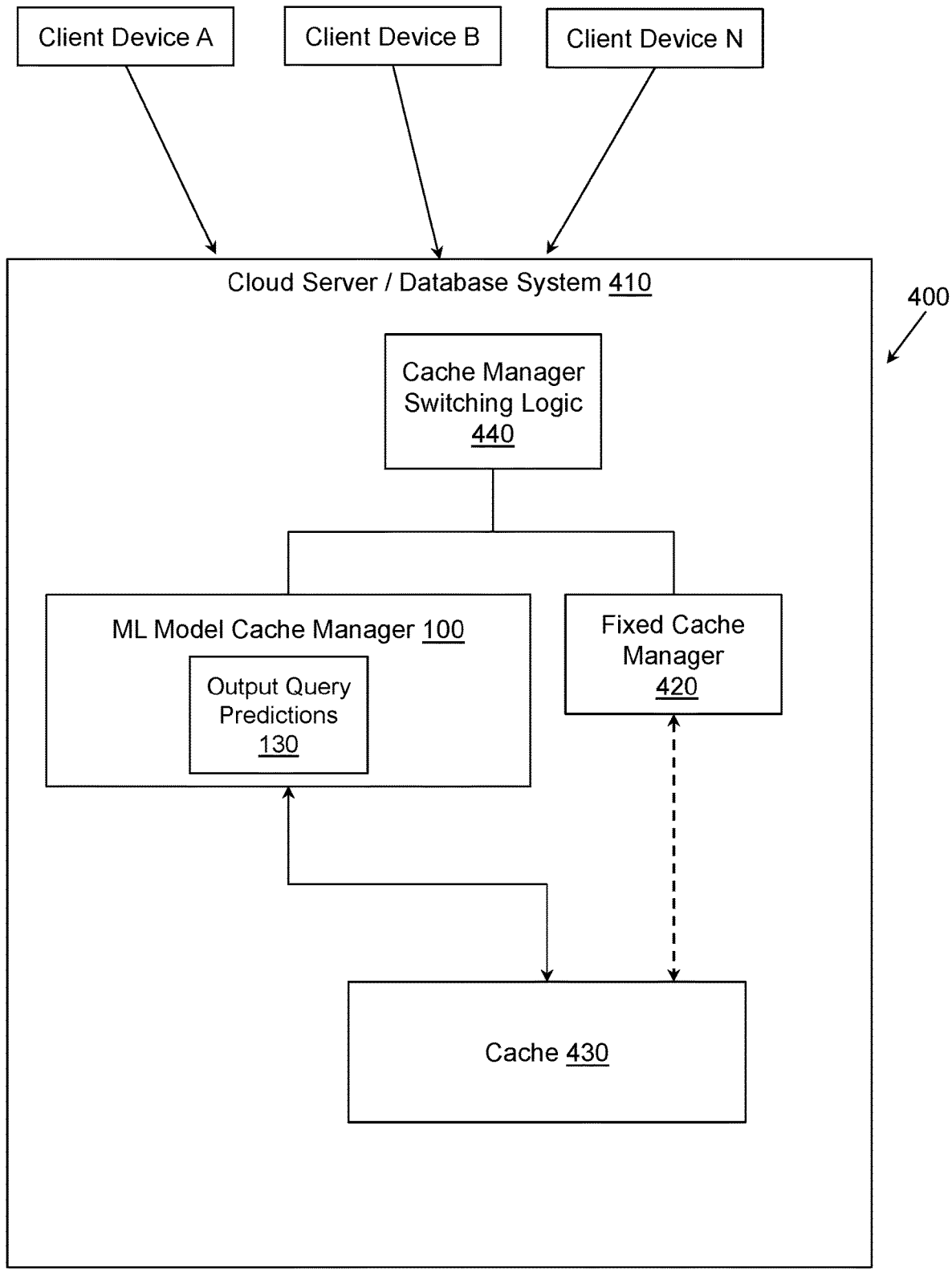
FIG. 4 illustrates an embodiment of a cache system associated with switching cache managers.

With reference to FIG. 4, one embodiment of a cache system 400 is illustrated. The cache system 400 may be implemented as part of a cloud server/database system 410 that receives and processes queries from multiple clients (e.g., client A, client B, ... client N). The cache system 400 includes the ML model cache manager 100 as previously described and at least one other fixed cache manager 420. The fixed cache manager is, for example, configured with a fixed caching algorithm (non-machine learning algorithm) such as Least Recently Used (LRU), Least Frequently Used (LFU), most recently used, random replacement, etc. In one embodiment, one of the cache managers is designated as the active cache manager to operate and control a cache 430.

In FIG. 4, the ML model cache manager 100 is shown as active (represented by the solid line to the cache 430) and the fixed cache manager 420 is shown as non-active (represented by the dashed line to the cache 430).

The cache system 400 further includes a cache manager switching logic 440 configured to monitor the accuracy of the ML cache manager 100 and switch between the two available caching managers. For example, the switching logic 440 may include a threshold cache hit-ratio that is set and used as an accuracy level for the ML model cache manager 100. In response to the cache hit-ratio falling below the threshold, the switching logic 440 determines that the query predictions and prefetching operations of the ML model cache manager 100 are not satisfactory (e.g., too many cache misses). The switching logic 440 may then deactivate the ML model cache manager 100 from operating with the cache 430 and activate the fixed cache manager 420 to operate with the cache 430. The ML cache manager 100 may then be retrained using feedback from the cache system and update and/or relearn predicted query patterns and trigger heuristics as described previously. The relearned and updated query predictions are stored as the query predictions 130.

After the ML model cache manager 100 is retrained to identify query patterns, the results (the query predictions 130) of the learned query patterns may be tested prior to reactivating the ML model cache manager 100. For example, real-time queries may be monitored and the ML model cache manager 100 may simulate its query predictions and prefetch operations, without actually changing the real data in the cache 430. The switching logic 440 may then monitor the cache hit ratio for the simulated predictions. Further adjustments to the parameters and predictions may be made to improve the cache hit ratio as a feedback loop to the ML model cache manager 100.

When a sufficient cache hit ratio is obtained (based on the threshold) for a defined amount of time, the switching logic 440 may reactive the ML model cache manager to predict and prefetch query results to the cache 430.

The switching logic 440 may then repeat the process by supervising the cache hit ratio. If the cache hit ratio falls below the threshold, the switching logic 440 changes the cache to activate and use the fixed cache manager 420 to serve queries.

This process may be actively repeated to update and improve the ML model cache manager 100. In another embodiment, since the query history logs 120 are live documents, meaning, new query entries would continue to be generated based on the real-time queries, newer data would be available to feed back to the ML model and improve prediction results.

Cloud or Enterprise Embodiments

In one embodiment, the ML cache manager 100 may be configured in a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the computing system is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 5:
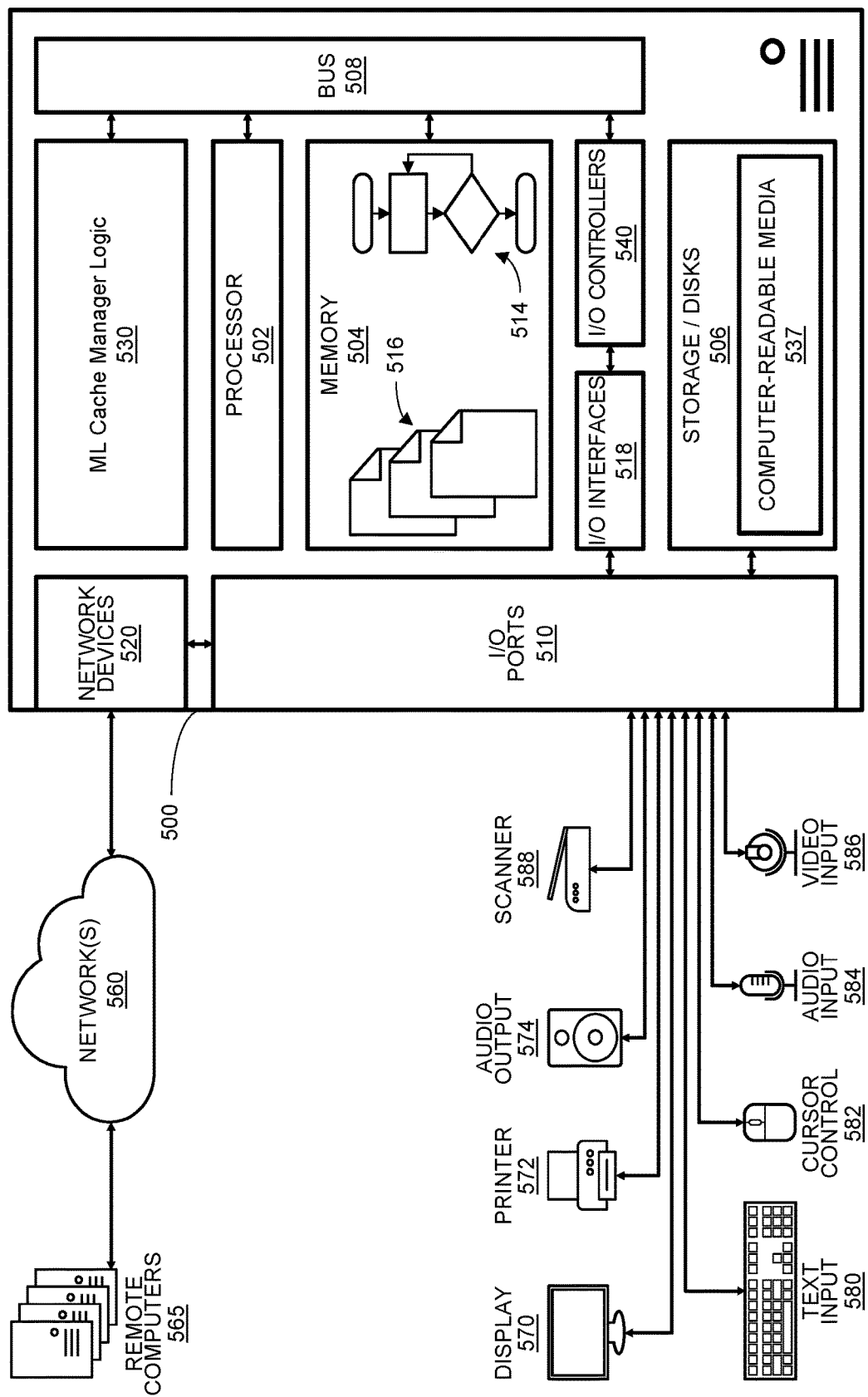
FIG. 5 illustrates an embodiment of a computing system configured with the example cache systems and/or methods disclosed.

FIG. 5 illustrates an example computing device that is configured and/or programmed as a special purpose computing device with one or more of the example cache systems and methods described herein, and/or equivalents. The example computing device may be a computer 500 that includes at least one hardware processor 502, a memory 504, and input/output ports 510 operably connected by a bus 508. In one example, the computer 500 may include ML cache manager logic 530 configured to facilitate query prediction and prefetching query results for a cache similar to ML cache manager 100 shown in FIGS. 1-4.

In different examples, the cache manager logic 530 may be implemented in hardware, a non-transitory computer-readable medium 537 with stored instructions, firmware, and/or combinations thereof. While the logic 530 is illustrated as a hardware component attached to the bus 508, it is to be appreciated that in other embodiments, the cache manager logic 530 could be implemented in the processor 502, stored in memory 504, or stored in disk 506.

In one embodiment, cache manager logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to make query predictions and prefetch query results for a cache. The means may also be implemented as stored computer executable instructions that are presented to computer 500 as data 516 that are temporarily stored in memory 504 and then executed by processor 502.

Cache manager logic 530 may also provide means (e.g., hardware, non-transitory computer-readable medium that stores executable instructions, firmware) for performing the functions of the ML cache manager 100 as described herein.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510 that are controlled by at least an input/output (I/O) controller 540. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with, control, and/or be controlled by input/output (I/O) devices via the input/output (I/O) controller 540, the I/O interfaces 518, and the input/output ports 510. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 506, network devices 520, and so on. The input/output ports 510 may include, for example, serial ports, parallel ports, and USB ports.

The computer 500 can operate in a network environment and thus may be connected to the network devices 520 via the I/O interfaces 518, and/or the 1/O ports 510. Through the network devices 520, the computer 500 may interact with a network 560. Through the network, the computer 500 may be logically connected to remote computers 565. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §§ 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:
   at least one processor connected to at least one memory;
   a cache configured to store data and operably connected to at least the processor;
   a cache manager configured to operate with the cache, comprising:
      a machine learning model trained to identify query patterns associated with one or more trigger heuristics, and configured to output a set of query predictions that identify the one more trigger heuristics that will trigger a predicted query pattern to occur;
      wherein the set of query predictions from the machine learning model includes, for each query prediction, a format of a tuple that identifies a predicted query pattern that is associated with one or more trigger heuristics that the machine learning model has learned which initiate the predicted query pattern;
   wherein the cache manager is configured to:
   monitor queries that are submitted for execution to a database system;
   for a received query from the queries monitored, parse the received query to identify one or more query heuristics associated with the received query;
   determine whether the one or more query heuristics matches the one or more trigger heuristics from the tuples from the set of query predictions;
   in response to the one or more query heuristics matching one or more trigger heuristics from a first tuple from the set of query predictions, identify a first predicted query pattern associated with the first tuple and submit the first predicted query pattern to the database system;
   prefetch query results corresponding to the first predicted query pattern; and
   store the prefetched query results in the cache;
   wherein the computing system further comprises a second cache manager configured to operate with the cache with a fixed caching algorithm, wherein the second cache manager is deactivated while the machine learning model is activated;
   wherein the computing system is configured to monitor a cache hit ratio of the cache manager and the machine learning model;
   in response to the cache hit ratio of the machine learning model falling below a threshold, switch to the second cache manager that is configured with the fixed caching algorithm by activating the second cache manager and deactivating the machine learning model from operating with the cache; and
   in response to the cache hit ratio of the second cache manager falling below the threshold, deactivate the second cache manager and activate the machine learning model to operate with the cache.

2. The computing system of claim 1, wherein the machine learning model is configured to receive query entries from a query history log and determine query patterns associated with the one or more trigger heuristics from the query entries in the query history log.

3. The computing system of claim 1, wherein the machine learning model is configured to receive a heuristic that represents a query source or query trigger condition, and to analyze query entries from a query history log to identify query patterns associated with the heuristic, wherein the heuristic is assigned as one of the trigger heuristics.

4. The computing system of claim 1, wherein the cache manager is configured to predict an upcoming query pattern based on at least parsing the received query by:
    retrieving one or more trigger heuristics from the set of query predictions, wherein the one or more trigger heuristics were identified by the machine learning model to be associated with a query pattern;
    determining whether the received query includes a parameter that matches one of the trigger heuristics; and
    in response to determining that the received query includes the parameter that matches one of the trigger heuristics, retrieve the query pattern associated with the matched trigger heuristic and prefetch results of the query pattern.

5. The computing system of claim 4, wherein the cache manager is further configured to predict the upcoming query pattern by, based on parsing the received query:
    determining that the received query includes the parameter that matches one of the trigger heuristics and determining the received query matches a query in the predicted query pattern associated with the matched trigger heuristics.

6. The computing system of claim 1, wherein the cache manager is configured to dynamically change one or more cache keys in the cache based on at least historical query data, wherein the one or more cache keys represent the prefetched query results.

7. A computer-implemented method, the method comprising:
    monitoring, by a cache manager, queries that are submitted for execution to a database system;
    for a given monitored query, parsing the given monitored query to identify one or more query heuristics associated with the given monitored query;
    determining whether the one or more query heuristics matches one or more trigger heuristics from a set of query predictions, wherein the set of query predictions are predicted by a machine learning model trained to identify query patterns from historical query entries;
    in response to the one or more query heuristics matching a first trigger heuristic from the one or more trigger heuristics, submitting a first predicted query pattern to the database system, wherein the first predicted query pattern corresponds to the first trigger heuristic from the set of query predictions;
    prefetching query results corresponding to the first predicted query pattern; and
    storing the prefetched query results in a cache;
    monitoring a cache hit ratio of the cache manager and the machine learning model;
    in response to the cache hit ratio of the machine learning model falling below a threshold, switching the cache manager to using a fixed caching algorithm by activating the fixed caching algorithm and deactivating the machine learning model from operating with the cache; and
    in response to the cache hit ratio of the fixed caching algorithm falling below the threshold, deactivating the fixed caching algorithm and reactivating the machine learning model to operate with the cache.

8. The method of claim 7, further comprising:
    training the machine learning model to identify query patterns associated with one or more trigger heuristics, wherein for a given trigger heuristic, a set of predicted queries are associated thereto.

9. The method of claim 7, further comprising:
    training the machine learning model by inputting query entries from a query history log, wherein the machine learning model learns query patterns associated with one or more heuristics from the query entries.

10. The method of claim 7, further comprising:
    training the machine learning model based on a heuristic that represents a query source or query trigger condition,
    wherein the machine learning model analyzes query entries from a query history log to identify query patterns associated with the heuristic; and
    setting the heuristic as a trigger heuristic for the query pattern.

11. The method of claim 7,
    wherein switching the cache manager includes switching to and activating a second cache manager that is configured with the fixed caching algorithm.

12. The method of claim 7, further comprising: wherein the cache manager predicts an upcoming query pattern based on at least parsing the monitored query by:
    retrieving one or more trigger heuristics from the set of query predictions, wherein the one or more trigger heuristics were identified by the machine learning model to be associated with a predicted query pattern;
    determining whether the monitored query includes a parameter that matches one of the trigger heuristics; and
    in response to determining that the monitored query includes the parameter that matches one of the trigger heuristics, retrieve the predicted query pattern associated with the matched trigger heuristic and prefetch results of the query pattern.

13. The method of claim 12, wherein predicting the upcoming query pattern further includes:
    determining that the monitored query includes the parameter that matches one of the trigger heuristics and determining the monitored query matches a first query in the predicted query pattern associated with the matched trigger heuristics.

14. The method of claim 7, further comprising dynamically changing cache keys in the cache based on at least historical query data, wherein the cache keys represent the prefetched query results.

15. A non-transitory computer-readable medium that includes stored thereon computer-executable instructions that when executed by at least a processor of a computer cause the computer to:
    monitor, by a cache manager, queries that are submitted for execution to a database system;
    wherein the cache manager is configured with a machine learning model to operate with a cache;
    wherein the machine learning model is trained to identify query patterns associated with one or more trigger heuristics, and configured to output a set of query predictions that identify the one more trigger heuristics that will trigger a predicted query pattern to occur;
    wherein the set of query predictions from the machine learning model includes, for each query prediction, a format of a tuple that identifies a predicted query pattern that is associated with one or more trigger heuristics that the machine learning model has learned which initiate the predicted query pattern;

for a given monitored query from the queries monitored, parse the monitored query to identify one or more query heuristics associated with the monitored query;

determine whether the one or more query heuristics matches one or more trigger heuristics from the tuples from the set of query predictions;

in response to the one or more query heuristics matching one or more trigger heuristics from a first tuple from the set of query predictions, identify a first predicted query pattern associated with the first tuple and submit first predicted query pattern to the database system;

prefetch query results corresponding to the first predicted query pattern;

store the prefetched query results in a cache;

monitoring a cache hit ratio of the cache manager and the machine learning model;

in response to the cache hit ratio of the machine learning model falling below a threshold, switching the cache manager to using a fixed caching algorithm by activating the fixed caching algorithm and deactivating the machine learning model from operating with the cache; and in response to the cache hit ratio of the fixed caching algorithm falling below the threshold, deactivating the fixed caching algorithm and reactivating the machine learning model to operate with the cache.

16. The non-transitory computer-readable medium of claim 15, wherein switching the cache manager includes switching to and activating a second cache manager that is configured with the fixed caching algorithm.

17. The non-transitory computer-readable medium of claim 15, further comprising instructions that when executed by at least the processor cause the processor to:

predict an upcoming query pattern based on at least parsing the monitored query by:

retrieving one or more trigger heuristics from the set of query predictions, wherein the one or more trigger heuristics were identified by the machine learning model to be associated with a predicted query pattern;

determining whether the monitored query includes a parameter that matches one of the trigger heuristics; and in response to determining that the monitored query includes the parameter that matches one of the trigger heuristics, retrieve the predicted query pattern associated with the matched trigger heuristics and prefetch results of the query pattern.

18. The non-transitory computer-readable medium of claim 17, further comprising instructions that when executed by at least the processor cause the processor to:

predicting the upcoming query pattern by:

determining that the monitored query includes the parameter that matches one of the trigger heuristics and determining the monitored query matches a first query in the predicted query pattern associated with the matched trigger heuristics.

19. The non-transitory computer-readable medium of claim 15, further comprising instructions that when executed by at least the processor cause the processor to:

dynamically change one or more cache keys in the cache based on at least historical query data, wherein the one or more cache keys represent the prefetched query results.

\* \* \* \* \*

UNITED STATES PATENT AND TRADEMARK OFFICE
CERTIFICATE OF CORRECTION

| | | |
|---|---|---|
| PATENT NO. | : 12,373,435 B2 | Page 1 of 1 |
| APPLICATION NO. | : 17/979560 | |
| DATED | : July 29, 2025 | |
| INVENTOR(S) | : Shekhar | |

It is certified that error appears in the above-identified patent and that said Letters Patent is hereby corrected as shown below:

In the Specification

In Column 17, Line 47, delete "1/O" and insert -- I/O --, therefor.

Signed and Sealed this
Sixteenth Day of December, 2025

John A. Squires
*Director of the United States Patent and Trademark Office*